(12) United States Patent
Viswanathan et al.

(10) Patent No.: US 10,929,166 B2
(45) Date of Patent: Feb. 23, 2021

(54) ENHANCED DATA STORAGE OF VIRTUAL NODES IN A DATA PROCESSING ENVIRONMENT

(71) Applicant: HEWLETT PACKARD ENTERPRISE DEVELOPMENT LP, Houston, TX (US)

(72) Inventors: Swami Viswanathan, Morgan Hill, CA (US); Xiongbing Ou, San Jose, CA (US); Vadim Finkelstein, San Francisco, CA (US); Kartik Mathur, Foster City, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 105 days.

(21) Appl. No.: 16/165,642

(22) Filed: Oct. 19, 2018

(65) Prior Publication Data

US 2020/0125381 A1 Apr. 23, 2020

(51) Int. Cl.
*G06F 9/455* (2018.01)
*G06F 8/65* (2018.01)
*G06F 13/20* (2006.01)

(52) U.S. Cl.
CPC .......... *G06F 9/45558* (2013.01); *G06F 8/65* (2013.01); *G06F 13/20* (2013.01); *G06F 2009/45595* (2013.01); *G06F 2213/0026* (2013.01)

(58) Field of Classification Search
None
See application file for complete search history.

(56) References Cited

U.S. PATENT DOCUMENTS

| 5,564,037 | A | 10/1996 | Lam | |
|---|---|---|---|---|
| 8,122,109 | B2 * | 2/2012 | Ciano | G06F 9/4856 709/220 |
| 8,959,509 | B1 * | 2/2015 | Sobel | G06F 9/4843 718/1 |
| 10,394,467 | B2 * | 8/2019 | Amann | H04L 61/3015 |
| 2008/0222375 | A1 * | 9/2008 | Kotsovinos | G06F 9/5083 711/162 |
| 2011/0321041 | A1 * | 12/2011 | Bhat | G06F 9/4856 718/1 |

(Continued)

FOREIGN PATENT DOCUMENTS

WO 2018/175864 A1 9/2018

OTHER PUBLICATIONS

Haselhorst et al., "Efficient Storage Synchronization for Live Migration in Cloud Infrastructures," IEEE, 2011, 8pg. (Year: 2011).*

(Continued)

*Primary Examiner* — Ryan D. Coyer
(74) *Attorney, Agent, or Firm* — Jaffery Watson Mendonsa & Hamilton

(57) ABSTRACT

Described herein are systems, methods, and software to enhance the management of virtual nodes in a computing environment. In one example, a method includes identifying a transition event for a first version of a virtual node executing on a first host, identifying a second host to support a second version of the virtual node, and initiating execution of the second version of the virtual node on the second host. In some implementations, the virtual node comprises a non-persistent portion on the executing host and a persistent portion on a second storage element.

20 Claims, 12 Drawing Sheets

(56) References Cited

U.S. PATENT DOCUMENTS

| | | | | |
|---|---|---|---|---|
| 2013/0054813 A1* | 2/2013 | Bercovici | ............. | G06F 9/4856 709/226 |
| 2014/0115579 A1* | 4/2014 | Kong | .................... | G06F 3/0605 718/1 |
| 2016/0378563 A1* | 12/2016 | Gaurav | ................. | G06F 9/5077 718/1 |
| 2016/0378564 A1* | 12/2016 | Gaurav | ................. | G06F 9/5077 718/1 |

OTHER PUBLICATIONS

Wang et al., "A Remote Backup Approach for Virtual Machine Images," IEEE, 2016, 4pg. (Year: 2016).*

Extended European Search Report received for EP Patent Application No. 19204076.4, dated Apr. 2, 2020, 09 pages.

\* cited by examiner

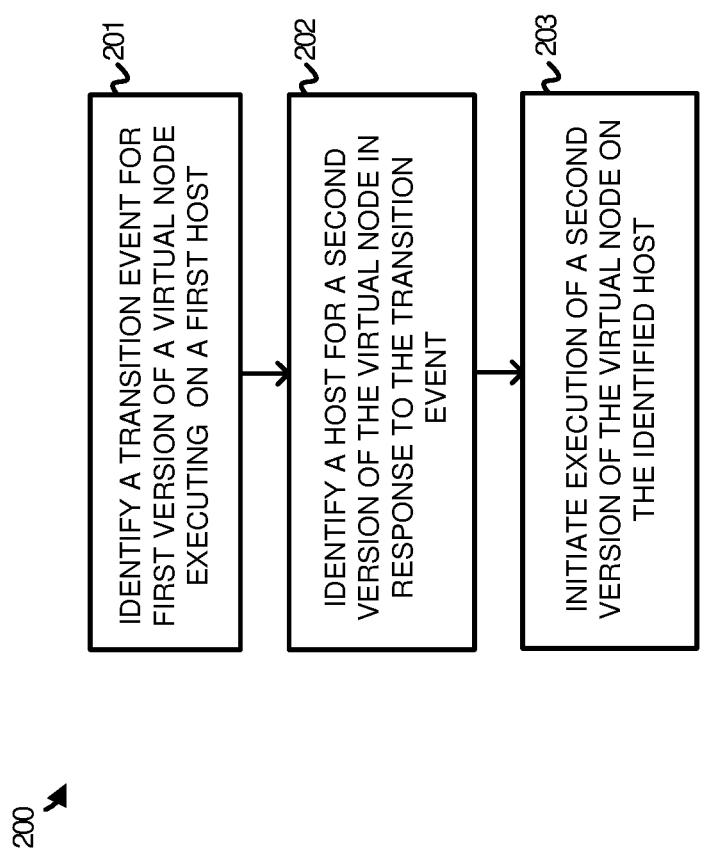

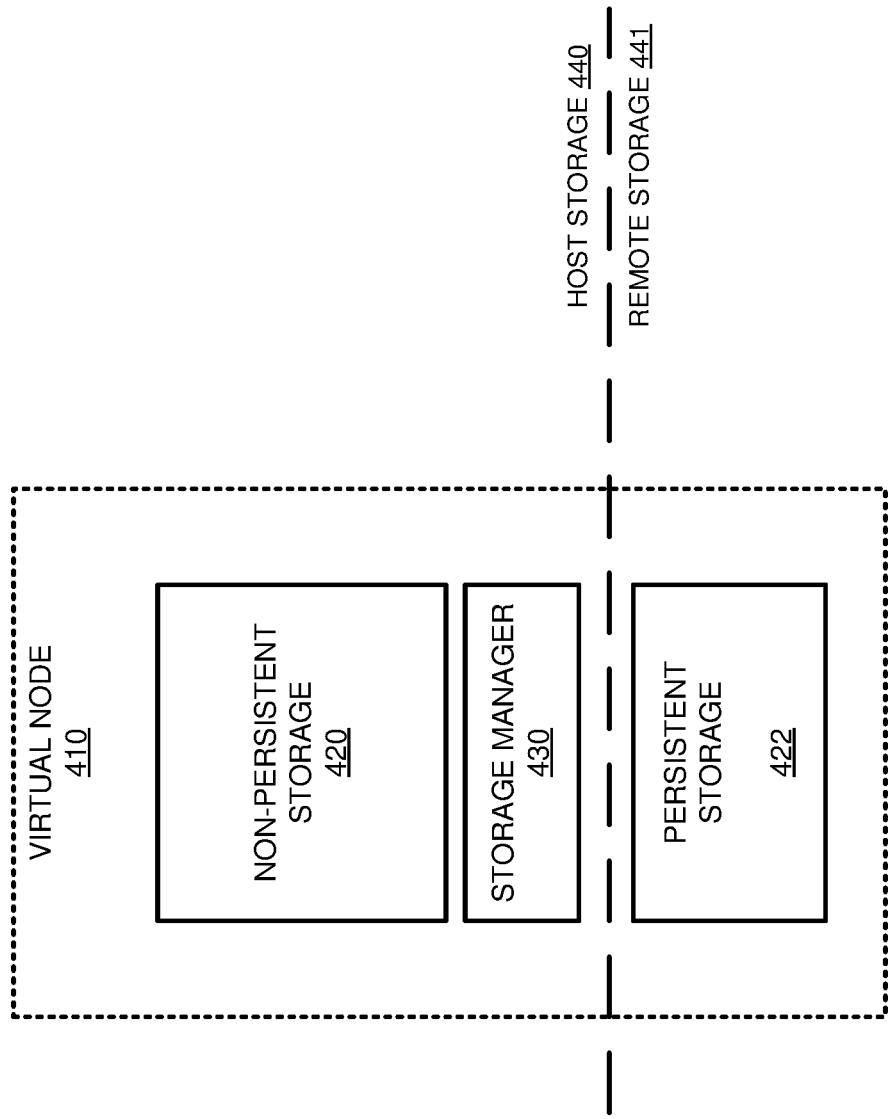

ENHANCED DATA STORAGE OF VIRTUAL NODES IN A DATA PROCESSING ENVIRONMENT

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, containers, such as Linux containers or Docker containers, jails, or other similar types of virtual containment nodes. However, although virtualization techniques provide increased efficiency within computing environments, difficulties often arise in allocating resources to the individual virtual nodes. Additionally, difficulties arise when virtual nodes are required to be migrated between hosts because of device failure, software updates, or some other migration or transition event.

SUMMARY

The technology described herein enhances the management of virtual nodes in a computing environment. In one implementation, a method includes identifying a transition event for a first version of a virtual node executing on a first host, wherein the first version of the virtual node comprises non-persistent storage on the first host and persistent storage on a second storage element. The method further includes, in response to the transition event, identifying a second host in the plurality of hosts for a second version of the virtual node. Once the second host is identified, the method further provides initiating execution of the second version of the virtual node on the second host, wherein the second version of the virtual node comprises non-persistent storage on the second host and the persistent storage on the second storage element.

BRIEF DESCRIPTION OF THE DRAWINGS

FIG. 2 illustrates an operation in a computing environment according to an implementation.

FIG. 4 illustrates an overview of a virtual node according to an implementation.

DETAILED DESCRIPTION

Figure 1:
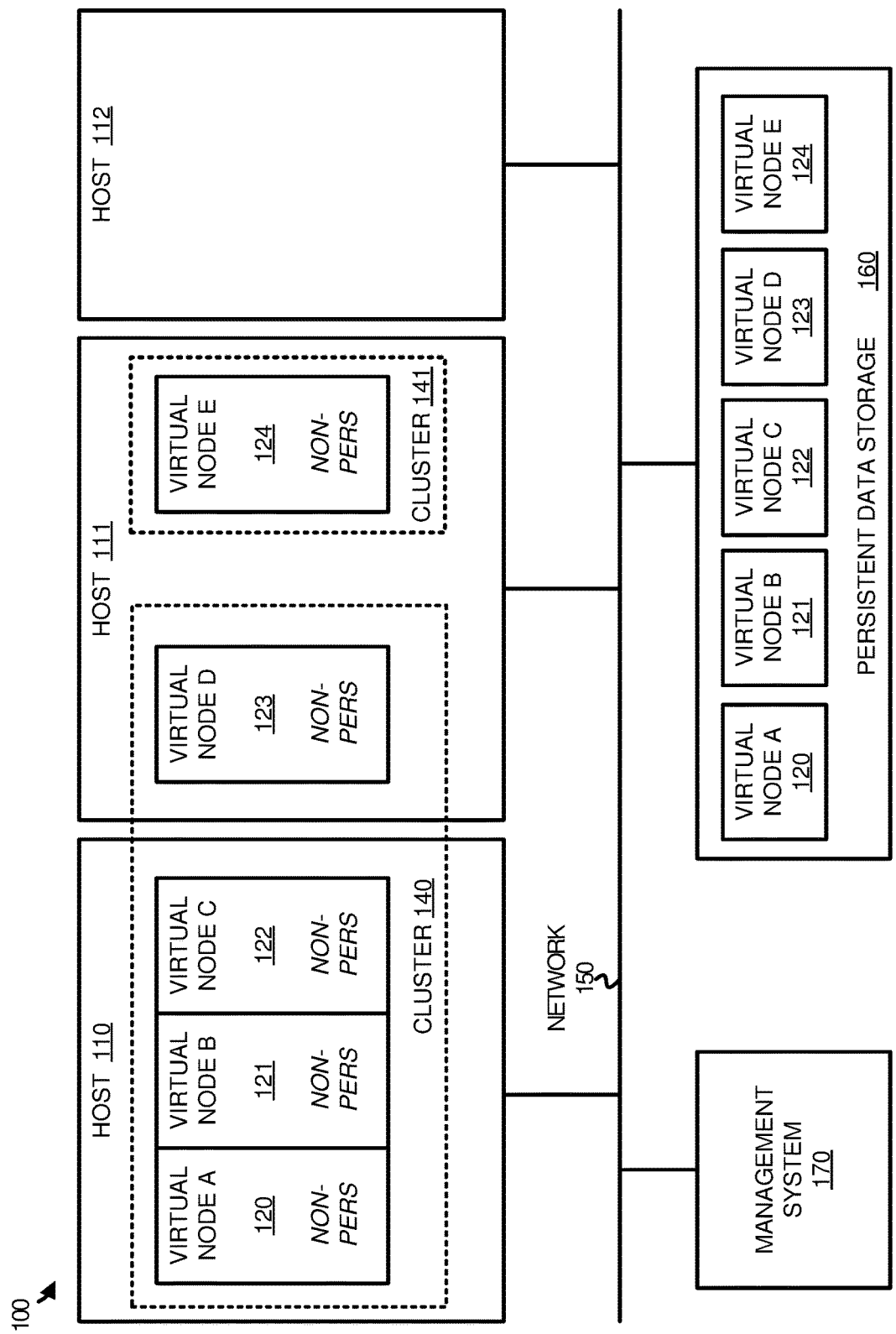
FIG. 1 illustrates a computing environment to manage nodes of cluster according to an implementation.

FIG. 1 illustrates a computing environment 100 to manage nodes of a cluster according to an implementation. Computing environment 100 includes hosts 110-112, management system 170, and persistent data storage 160. Hosts 110-112 execute virtual nodes 120-124, wherein virtual nodes 120-123 correspond to cluster 140, and virtual node 124 corresponds to cluster 141. In some implementations, clusters 140-141 comprise large-scale data processing clusters capable of processing large data sets in parallel using the nodes of the cluster. These clusters may comprise Hadoop clusters, Spark clusters, or some other similar type of cluster. Hosts 110-112, management system 170, and persistent data storage 160 may communicate using network 150.

In operation, virtual nodes 120-124 execute on hosts 110-112 to provide various data processing functions in computing environment 100. Each virtual node of virtual nodes 120-124 includes a non-persistent storage portion that is stored locally on the executing host and is available for as long as the nodes execute on the host (e.g. ephemeral storage, or some other storage that is valid for as long as the node executes on the host), and further includes a persistent storage portion that is stored in persistent data storage 160, wherein the persistent storage portion may be persistent as the node is moved between hosts. As an example, virtual node A 120 includes a non-persistent portion on host 110 and a persistent portion that is stored in persistent data storage 160 (example secondary storage element), wherein persistent data storage 160 may comprise another server or servers, a storage area network (SAN), a networked attached storage unit, or some other separate storage device attached to or accessible to hosts 110-112. Virtual nodes 120-124 may comprise containers in some examples, wherein the containers may comprise Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

In executing each virtual node, hosts 110-112 may include a process, such as a driver or file system, capable of identifying requests for each of the containers and directing the requests to either the non-persistent portion of the virtual node or the persistent portion of the virtual node. In some implementations, each of the directories (and in some examples files) associated with a virtual node may indicate whether the data is stored locally or is stored on remote persistent data storage 160. Consequently, when a data request is generated, the process on the host may determine whether the directory or file corresponds to locally stored data or remote data and obtain the data as required. As an example, when virtual node A 120 generates a data request, host 110 may determine whether the data is stored locally or remotely, and access the required data to satisfy the request.

In some implementations, the configuration of the containers in computing environment 100 may be dynamic. In particular, containers may migrate between hosts, be added to a new or existing cluster, removed from a new or existing cluster, or require some other similar configuration modification to computing environment 100. For example, if virtual node E 124 is to be migrated from host 111 to host 112, an image of the non-persistent portion may be stored on host 112 and virtual node E 124 may initiate execution using the non-persistent data stored on host 112 and the persistent data from persistent data storage 160. Advantageously, this permits the persistent data to be available to the first version of virtual node on host 111 until the virtual node is ready to be executed on host 112. Once ready for execution on host 112, host 111 may stop the execution of the node, while host 112 may initiate the execution of the node using the same persistent portion of the virtual node. In maintaining the persistent portion of the virtual node while changing the host of execution, the computing environment may limit the downtime of the node while maintaining the state operations of the node.

In some examples, in generating an image for a virtual node, an administrator may define the portions of the virtual node that are persistent and the portions that are non-persistent. The persistent portion may include any files and directories, such as configuration files and directories, may include temporary storage for the virtual node, or may comprise any other data that is associated with the state of the virtual node in the virtual cluster. In many implementations, the persistent storage may include portions of the virtual node that are capable of read/write operations as part of the execution of the virtual node, such as configuration files or other stateful files for the virtual node. In contrast, the non-persistent portion of the virtual node may comprise portions of the virtual node that are not required in maintaining the state of the virtual node. These files and directories may comprise read-only data for the virtual node, may comprise log files that are read/write but not required for the state of the virtual node, or may comprise some other file or directory that is not required for the state of the virtual node. In at least one implementation, in defining the portions of the virtual node that are persistent and non-persistent, management system 170 may provide suggestions of which portions should be classified as persistent and which portions should be classified as non-persistent. These recommendations may be based on previous executions of virtual nodes, settings of other administrators, the type of large-scale processing platform for the virtual node (Hadoop, Spark, and the like), or some other similar factor. For example, when a cluster is requested by an administrator, management system 170 may determine the type of large-scale processing platform requested and determine files and directories that are required to maintain the state for the platform. Once the stateful files and directories are identified, management system 170 may recommend, or in some examples automatically, store the stateful files and directories in persistent data storage 160, while the remaining files and directories are stored locally in the host. The driver and/or file system for the cluster may then direct data requests of the virtual nodes to persistent or non-persistent storage as required.

FIG. 2 illustrates an operation 200 in a computing environment according to an implementation. The processes of operation 200 are referenced parenthetically in the paragraphs that follow with reference to systems and elements of computing environment 100 of FIG. 1.

As described herein, a computing environment may deploy a plurality of virtual nodes, wherein each virtual node may correspond to a non-persistent portion that is located on the executing host and a persistent portion that is remotely located on a persistent storage system. During the execution of the virtual nodes, operation 200 identifies (201) a transition event for a first version of a virtual node executing on a first host to transition to a second host in the computing environment. This transition event may occur when an update is requested for one of the hosts 110-112, when a device failure occurs for hosts 110-112, may occur as a result of load balancing, may occur in response to a user request for the migration, or may occur as a result of any other similar transition event. In some implementations, the transition event may be identified by management system 170, wherein management system 170 may identify a user request to migrate or transition the virtual node, may identify a device failure, may identify an update requirement, or may identify any other indicator associated with the transition event.

In response to identifying the transition event, operation 200 further identifies (202) a second host for a second version of the virtual node. This second host may be identified or selected based on load balancing across hosts 110-112, based on minimum processing requirements for the virtual node, based on a user selection of the second host, or some other similar method of identifying the second host. In some implementations, the identifying of the second host may occur at management system 170, however, it should be understood that the first host may identify the second host by exchanging status information with the other hosts to identify a second host capable of supporting the operations of the virtual node.

Once the second host is identified to support the execution of the virtual node, operation 200 initiates (203) execution of a second version of the virtual node on the identified second host, wherein the second version of the virtual node includes a non-persistent portion stored locally on the second host and the same persistent portion stored on the persistent data storage 160. In some implementations, prior to initiating execution of the second version of the virtual node, an image of the non-persistent portion may be deployed to the second host. Referring to an example migration of virtual node E 124 from host 111 to host 112, an image of the non-persistent portion of virtual node E 124 may be supplied to host 112 and stored locally on host 112. Once the image is ready for execution, host 112 may initiate execution of virtual node E 124 using the local non-persistent portion and the persistent portion of virtual node E 124. Prior to the execution of virtual node E 124 on host 112, host 111 may stop the execution of virtual node E 124 on host 111. In this manner, a new copy of the non-persistent portion of the virtual node is supplied to the new host while maintaining the use of the same persistent portion of the virtual node.

In some implementations, the persistent storage for a virtual node may be used to store stateful data for the virtual node for its execution in the virtual cluster. This stateful data may include temporary storage for the data processing operations of the virtual node, configuration information for the virtual node, or some other similar state information. In contrast, non-persistent storage for the virtual node may include information that is not required in maintaining the state of the virtual node, wherein the non-persistent data may comprise read-only data, log files, or some other similar data that is not required in the transition of a virtual node from a first host to a second host.

Figure 3A:
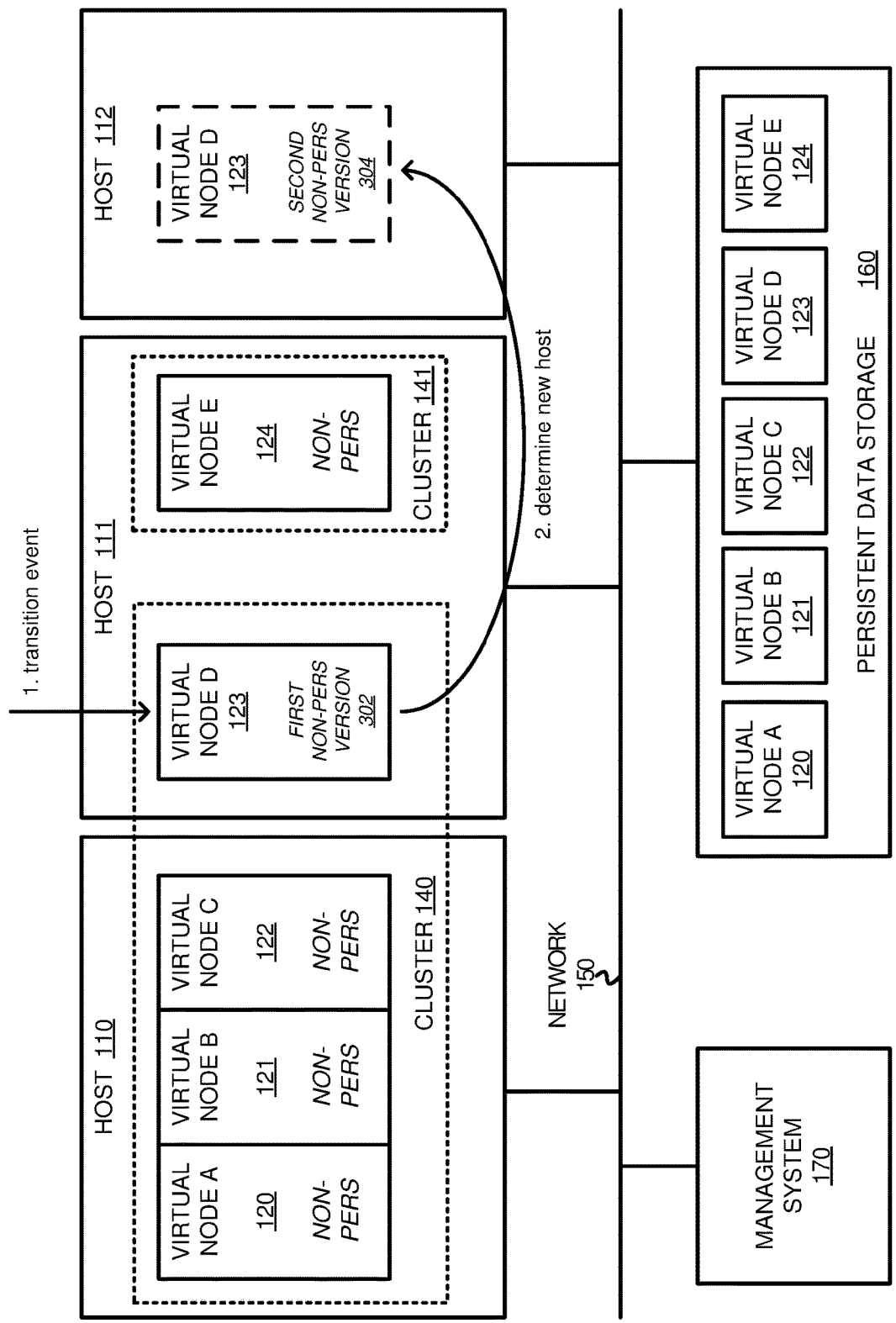
FIGS. 3A-3B illustrate an operational scenario of migrating a node according to an implementation.
Figure 3B:
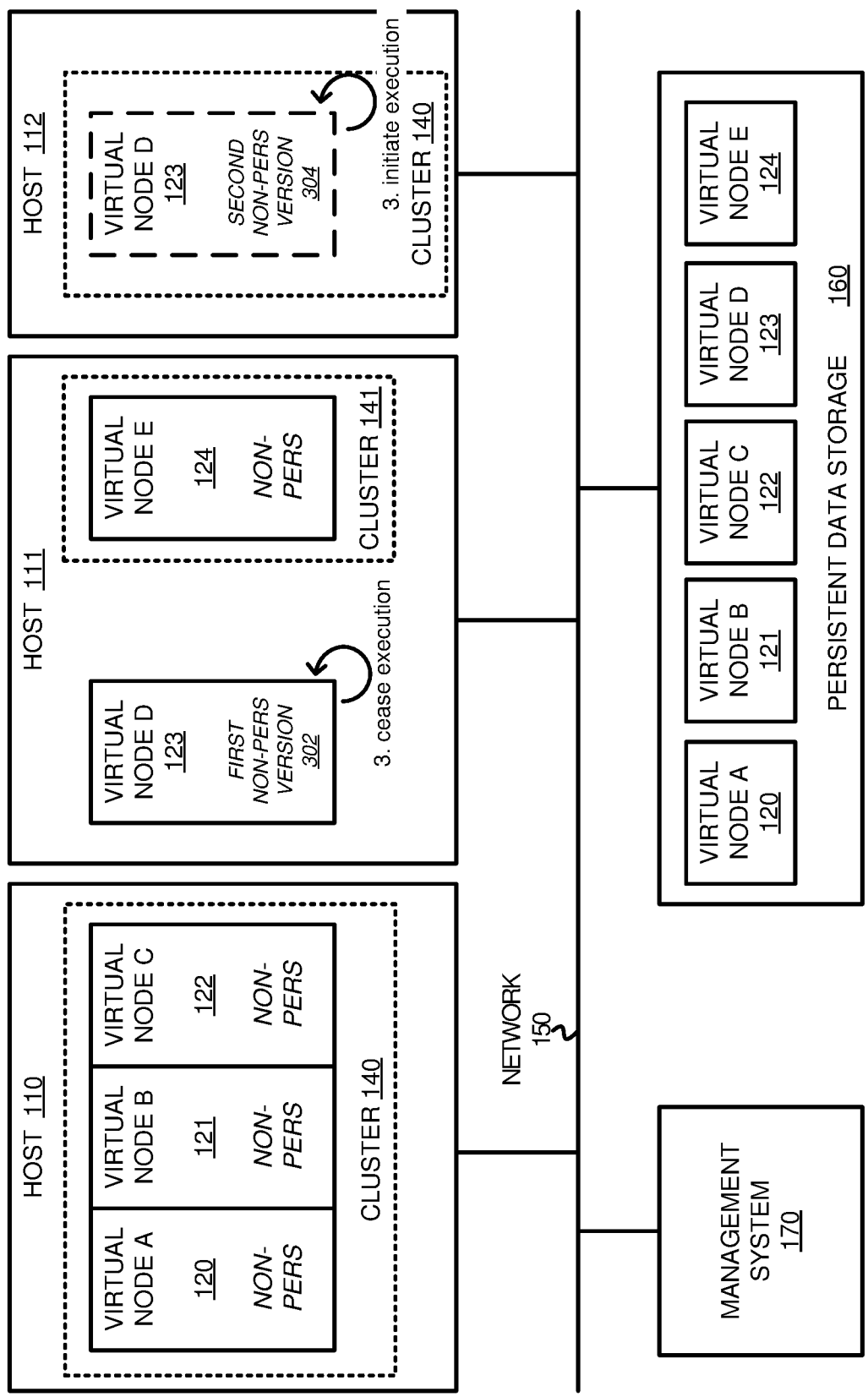

FIGS. 3A-3B illustrate an operational scenario of migrating a node according to an implementation. FIGS. 3A-3B include systems and elements of computing environment 100 of FIG. 1.

Referring first to FIG. 3A, the computing environment encounters a transition event, at step 1, for virtual node D 123 comprise first non-persistent version 302, wherein the transition event comprises an event to transition the virtual node from host 111 to a different host. This transition event may comprise a hardware or software failure related to host 111, may comprise a request from an administrator to migrate virtual node D 123 to another host, may comprise an update to the software of host 111, or may comprise some other similar transition event. In some implementations, the transition event may be identified by host 111 supporting the execution of the virtual node, however, it should be understood that the transition event may be identified by management system 170 in some examples. In response to identifying the transition event corresponding to virtual node D 123, the operation determines, at step 2, a new host 112 to support the execution of the virtual node. In some implementations, host 111 or management system 170 may determine the second host based on load balancing operations, operating system requirements, or processing requirements of the virtual node. As an example, virtual node D 123 may require a particular quantity of processing cores, memory, or some other similar computing resource. As a result, host 111 or management system 170 may determine a second host in the computing environment capable of satisfying the required computing resources.

Turning to FIG. 3B, after the new host 112 is identified to support the transition event, the operation may initiate, at step 3, execution of virtual node D 123 on host 112, wherein virtual node D 123 on host 112 comprises second non-persistent version 304. In some implementations, to execute the virtual node on the second host, management system 170 may supply an image of the non-persistent portion of the virtual node to host 112, wherein the image may include addressing data directing the processing system of host 112 to either obtain data locally or from the data storage 160. Once the image is provided to host 112 and locally stored on host 112, host 112 may initiate execution of virtual node D 123 with second non-persistent version 304, at step 3, while virtual node D 123 ceases execution on host 111 with first non-persistent version 302. In some implementations, virtual node D 123 may cease execution on host 111 prior to the execution on host 112. In triggering the execution stoppage of virtual node D 123 on host 111, host 112 may provide a notification to host 111 indicating that the new virtual node is ready for execution. Once the virtual node is stopped on host 111, host 111 may provide a notification to host 112 indicating that the execution of the new virtual node may begin. In other implementations, when host 111 encounters a hardware or software failure, host 112 may initiate execution of virtual node D 123 when the image is deployed. Further, in some examples, during the migration of the virtual node from the original host to the new host, management system 170 may configure network elements (such as software defined network elements) to provide the proper functionality for the cluster. This may include configuring physical and/or virtual routers and switches to forward/transfer packets for virtual node D 123 to host 112 rather than host 111.

Although demonstrated as separate in the example of computing environment 100, it should be understood that management system 170 may execute wholly or partially as part of hosts 110-112 in the computing environment. Further, while not depicted in the computing environment, distributed storage repositories may store data for processing by the nodes of the computing environment, wherein the distributed storage repositories may be located on the same host computing elements or on other computing elements capable of communication via network 150.

FIG. 4 illustrates an overview of a virtual node according to an implementation. The overview of FIG. 4 includes virtual node 410 with non-persistent storage 420, storage manager 430, and persistent storage 422. Non-persistent storage 420 and storage manager 430 are stored as part of host storage 440, while persistent storage 422 is stored as remote storage 441. Remote storage 441 may comprise a server or servers, a storage area network (SAN), a networked attached storage unit, or some other separate storage device from the host. The host may communicate with remote storage 441 using ethernet, fibre channel, Peripheral Component Interconnect Express (PCIe), or some other similar connection, wherein remote storage 441 is accessible by multiple hosts of a computing environment. In some implementations, virtual node 410 may comprise a large-scale data processing node that accesses and processes data from object storage or distributed file systems as part of a cluster.

Although illustrated in the example of FIG. 4 with storage manager 430 executing as part of the virtual node, storage manager 430 may operate as a host process that executes separate from the virtual node. In some implementations, storage manager 430 may operate as a kernel process capable of identifying data requests associated with the node and directing the requests to non-persistent storage 420 or persistent storage 422 based on the request.

In some implementations, when generating the image for the virtual node, an administrator may define the directories and files that should be stored locally on the host or remotely on the persistent storage system. In defining what data should be stored in what location, the administrator may determine which files and directories may be modified during the course of execution of the virtual node. For example, configuration files may be modified during the course of execution, wherein the configuration files may indicate data to be processed, the status of the data processing, or some other similar information about the status of the virtual node. In some examples, the management system of the computing environment may suggest files or directories that are often written to as part of the execution virtual node to be stored in the persistent storage system. From these suggestions, the user may select files and directories to be stored in the persistent storage system and an image may be generated that indicates where static or dynamic data should be stored upon deployment of the virtual node.

Figure 5:
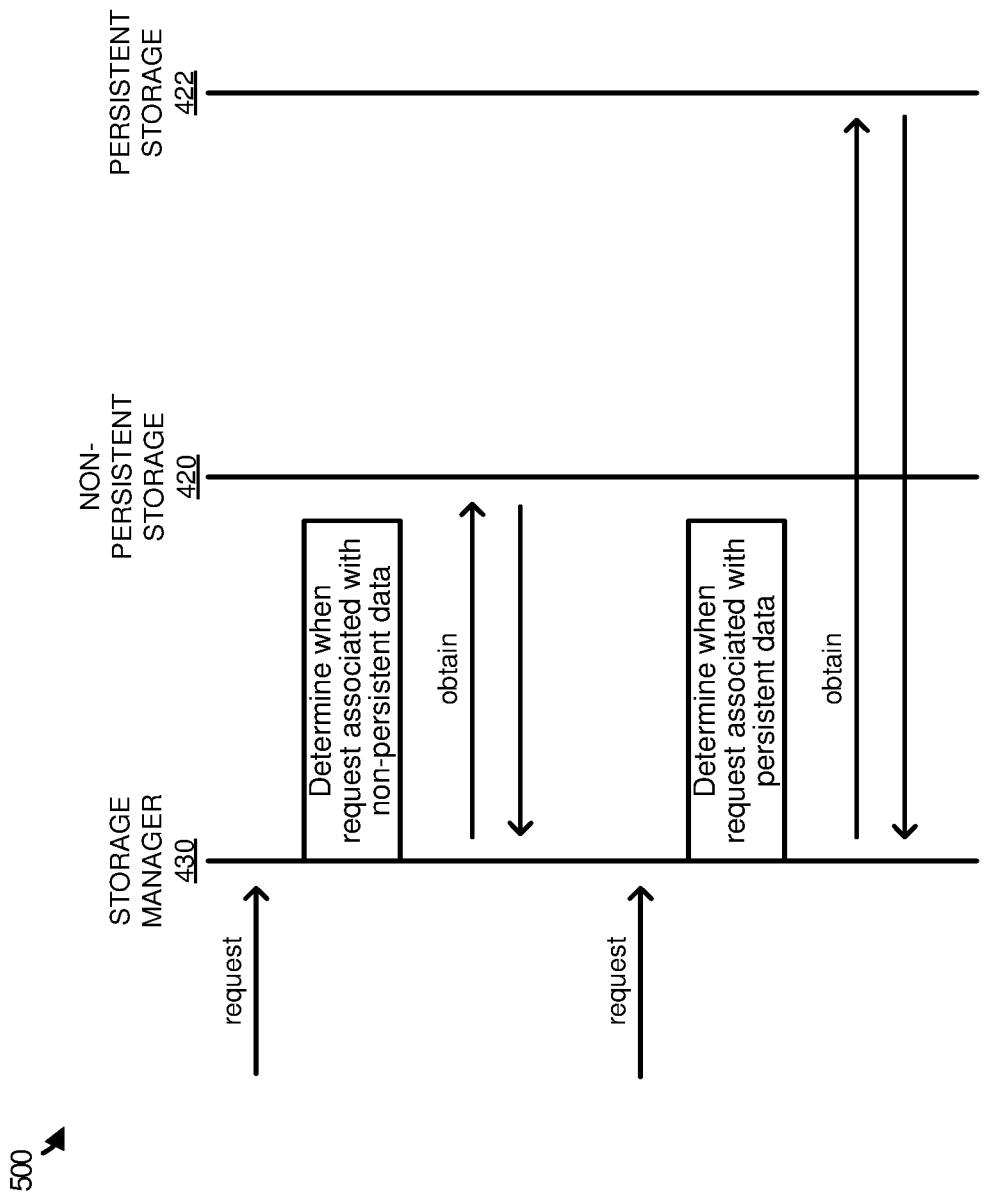
FIG. 5 illustrates a timing diagram of managing data requests for a virtual node according to an implementation.

FIG. 5 illustrates a timing diagram 500 of managing data requests for a virtual node according to an implementation. Timing diagram 500 includes storage manager 430, non-persistent storage 420, and persistent storage 422 of virtual node 410.

As depicted, storage manager 430 receives a data request from a process associated with virtual node 410. In response to the request, storage manager 430 may determine when the request is associated with non-persistent data and obtain the data from non-persistent storage 420, wherein non-persistent storage 420 corresponds to local storage for the host. In some implementations, when deploying containers, an administrator associated with the cluster may define the files and/or directories that are to be non-persistent and those that are to be designated as persistent. As a result, when a new container is deployed, portions of the image may be stored in local storage on the host as non-persistent storage or may be stored in remote storage available for persistent data. When storage input/output requests are received, storage manager 430 may determine whether the required file or directory is associated with non-persistent data or persistent data, and may obtain the data from the associated repository.

Also depicted in FIG. 5, storage manager 430 may receive a second request from a process associated with virtual node 410. In response to the request, storage manager 430 may determine when the request is associated with persistent data and obtain the required data from persistent storage 422 associated with virtual node 410. Although demonstrated in the example of timing diagram 500 as obtaining a request to read data, it should also be understood that storage manager 430 may also obtain requests to write data. When a request is received that is associated with a write, storage manager 430 may access persistent storage 422 to store the required data.

Figure 6:
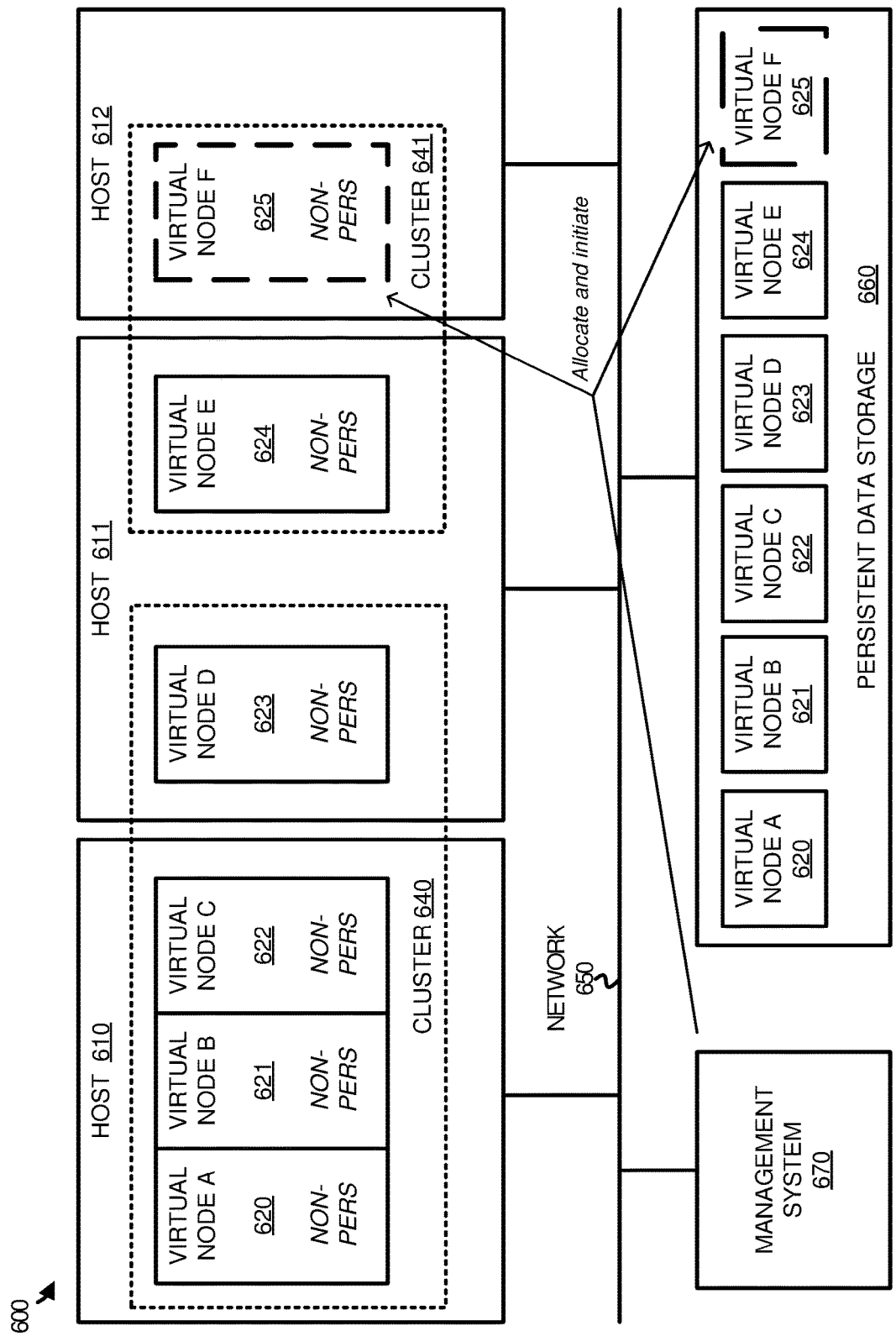
FIG. 6 illustrates an operational scenario of allocating a new virtual node according to an implementation.

FIG. 6 illustrates an operational scenario 600 of allocating a new virtual node according to an implementation. Operational scenario 600 includes hosts 610-612, management system 670, and persistent data storage 660. Hosts 610-612 provide a platform for virtual nodes 620-625, wherein virtual nodes 620-623 operate as part of cluster 640 and virtual nodes 624-625 operate as part of cluster 641.

In operation, virtual nodes are executed by hosts 610-612 to provide various data processing functions. In deploying each virtual node of virtual nodes 620-625, the nodes include a non-persistent portion that is stored locally on the host of execution and persistent portion that is stored remotely from the host system in persistent data storage 660. As a result, when a data request is generated that corresponds to a virtual node, the host may determine addressing associated with the request and obtain the data from local or remote storage. In some implementations, in generating a deployment image for the virtual nodes, an administrator associated with the computing environment may define the data that will be modified or required to be in persistent storage, while the data that is not modified may be stored locally on the executing host. In some examples, for large-scale data processing nodes in a cluster (such as Hadoop data processing nodes), the persistent data may comprise configuration files that may change during the operations on the datasets.

As depicted in the example of operational scenario 600, a request may be generated to allocate a new virtual node F 625 to cluster 641. In some examples, an administrator associated with the computing environment may provide input indicating the cluster to be modified, the type of modification (e.g., adding a new node, removing a node, and the like), credentials for the modification, or some other similar information. In response to the request, management system 670 may determine or select one of the hosts 610-612 to support the request and allocate and initiate the execution of virtual node F 625.

In some implementations, in selecting the host to support the execution of virtual node F 625, management system 670 may perform load balancing operations to balance the execution load of the virtual nodes in the computing environment. In some examples, management system 670 may determine resource requirements associated with the node and identify a host capable of providing the resource requirements to virtual node F 625. Once a host is identified, management system 670 may deploy the image associated with the virtual node. In particular, management system 670 may allocate storage in persistent data storage 660 for the persistent portion of virtual node F 625 and may allocate storage on host 612 for the non-persistent portion of virtual node F 625. Once the storage is allocated and the data corresponding to the node is stored, host 612 may initiate execution of virtual node F 625 using both the local data and data in persistent data storage 660.

Figure 7:
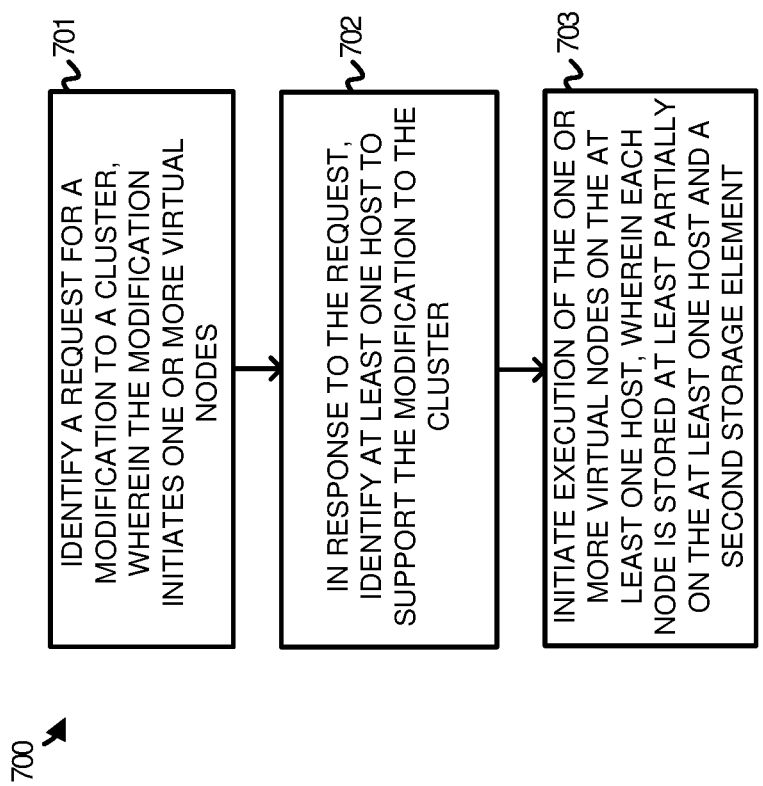
FIG. 7 illustrates an operation of a computing environment to allocate a new virtual node according to an implementation.

FIG. 7 illustrates an operation 700 of a computing environment to allocate a new virtual node according to an implementation. The functions of operation 700 are referenced parenthetically in the paragraphs that follow with reference to systems and elements of operational scenario 600 of FIG. 6. Operation 700 may be performed by management system 670 in some implementations.

As depicted, operation 700 may direct management system 670 to identify (701) a request for a modification to a cluster, wherein the modification may initiate one or more virtual nodes. In some implementations, the request may be generated by an administrator of the computing environment, wherein the administrator may define a cluster for the modification, a type of node to be added to the cluster, any resource requirements for the node, information about the data that is non-persistent and the data that should be available for persistent operations, or any other similar information to support the modification. In response to the request, operation 700 may identify (702) at least one host to support the modification to the cluster, wherein the host may be selected based on the resource requirements of the nodes or a load balancing determination of the available hosts in the computing environment. Once a host is selected, operation 700 may initiate (703) execution of the one or more virtual nodes on the at least one host, wherein the data for each virtual node is stored at least partially on the at least one host executing the virtual node and a second storage element communicatively coupled to at least one host.

To further describe operation 700 using the example elements from FIG. 6, when a request is generated for virtual node F 625, management system 670 determines that host 612 should be allocated for the virtual node. Once identified to support the request for the new virtual node, the image of the virtual node may be deployed, wherein at least a portion of the data for the virtual node may be stored in storage local to host 612, such as solid state storage, hard disk storage, or some other storage that is local to host 612, while a second portion of the data for the virtual node may be stored in persistent data storage 660 that may be communicatively coupled to hosts 610-612 using ethernet, fibre channel, PCIe fabric, or some other similar communication protocol. Once stored in persistent data storage 660 and locally on host 612, host 612 may initiate execution of virtual node F 625 using the data that is stored at the host and in persistent data storage 660.

In some implementations, when a modification is generated for cluster 641, management system 670 may further configure networking to support the communication between the virtual nodes of the cluster and, in some examples, at least one data repository. The networking configuration may include modifying physical and logical routers and switches to provide the desired networking for the various clusters. In at least one implementation, the networking configuration may be used to separate and secure the various clusters as different virtual networks in the computing environment.

Although demonstrated in the example of FIG. 7 as adding a virtual node to a cluster, management system 670 may also be used to remove virtual nodes from the cluster. As an example, if one or more virtual nodes were to be removed from cluster 640, management system 670 may identify the hosts running the nodes and stop the execution of the virtual nodes on those hosts. In some implementations, management system 670 may further delete the non-persistent portions or the persistent portions associated nodes. In other implementations, if the nodes may be added to the cluster again, at least the persistent portion of the virtual node may be preserved, such that the node may be redeployed by providing just the non-persistent portion of the image to a host of hosts 610-612 and initiating execution of the node on the corresponding host.

Figure 8:
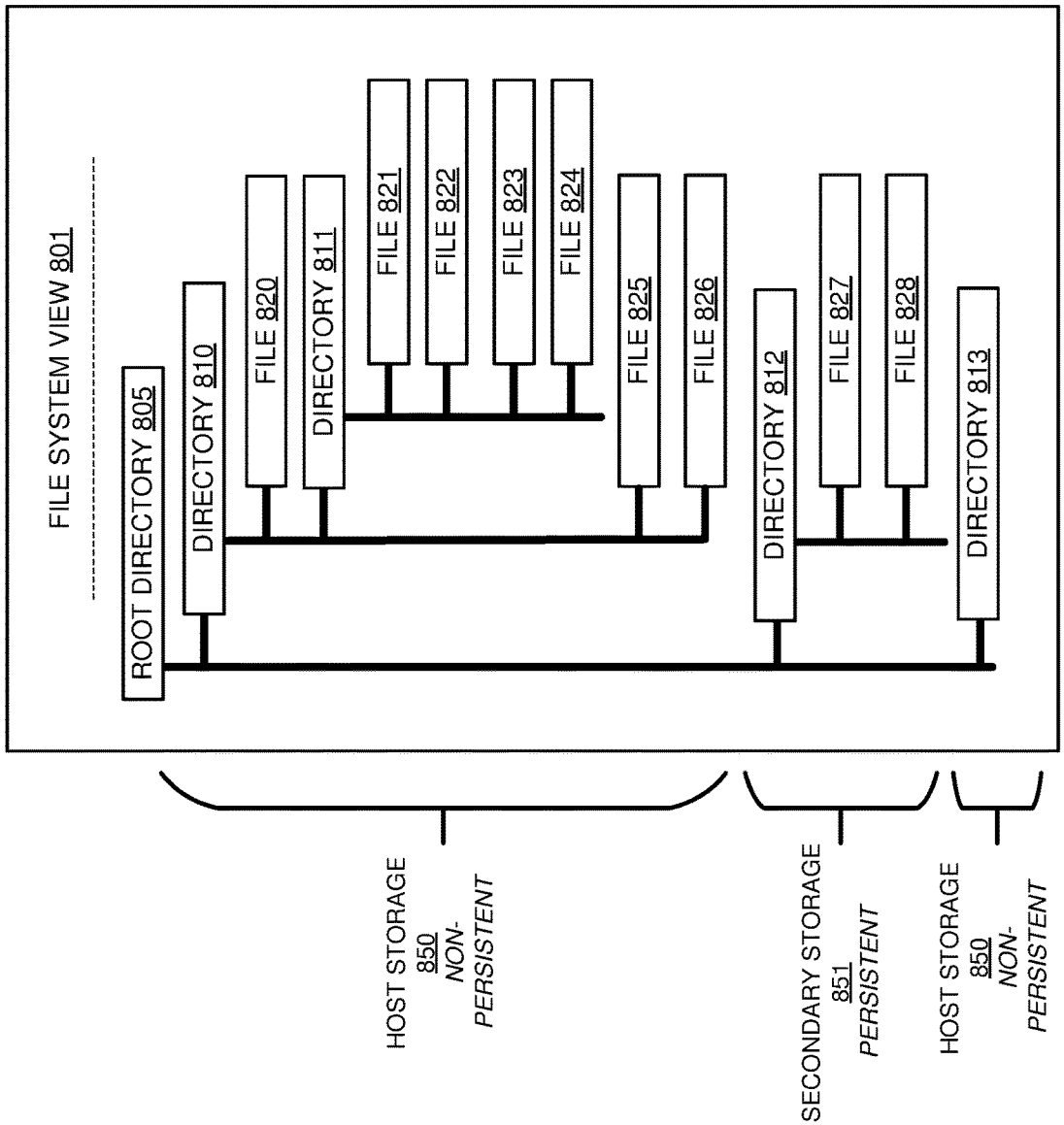
FIG. 8 illustrates a file system view for a virtual node according to an implementation.

FIG. 8 illustrates a file system view 801 for a virtual node according to an implementation. File system view 801 includes root directory 805, directories 810-813, and files 820-828. File system view 801 is an example file system that may be deployed as part of a virtual node in a computing environment.

As described herein, virtual nodes may be deployed within a computing environment to provide various data processing operations. In deploying the virtual nodes, a first portion of the data (non-persistent data) for a virtual node may be stored locally on the host associated with the virtual node, while a second portion of the data (persistent data) for the virtual node may be stored on a secondary storage element communicatively coupled to hosts of the computing environment. In some implementations, the non-persistent data for a node may be stored as ephemeral or non-persistent data that is available while the node is actively executing on the host, while the persistent data may be stored as persistent storage in the secondary storage element to be used whenever the node is executing (i.e. available between migrating hosts). In defining the configuration of the virtual node, an administrator or user associated with the virtual node or the cluster may define which portions of the data are non-persistent or persistent. The persistent portions may include configuration files that are modified as part of the execution of the virtual node, temporary storage for the virtual node, or some other portion of the virtual node. Once defined, an image for the virtual node may be generated that indicates a storage location for the portions of the virtual node. Using the example of file system view 801, when a virtual node deployment is requested for the virtual node associated with file system view 801, a management system may store directories 810 and 813 in host storage 850 that is local to the corresponding host, while directory 812 is stored in secondary storage 851 communicatively coupled to the host. Once the image is stored in either host storage 850 or secondary storage 851, the host may initiate execution of the corresponding virtual node.

In some implementations, when the image is deployed to a host, addressing data is included that indicates whether the required data is located on host storage 850 or secondary storage 851. As an example, a driver or some other similar process executing on the host may identify a request for file 821 and determine whether the address for file 821 corresponds to host storage 850 or secondary storage 851. Because file 821 is stored on host storage 850, the host may access the data from the local storage 850 to provide the required operation. In contrast, if a request corresponded to file 827, the host may determine that the required data corresponds to secondary storage 851 and may access the required data from the secondary storage.

Figure 9:
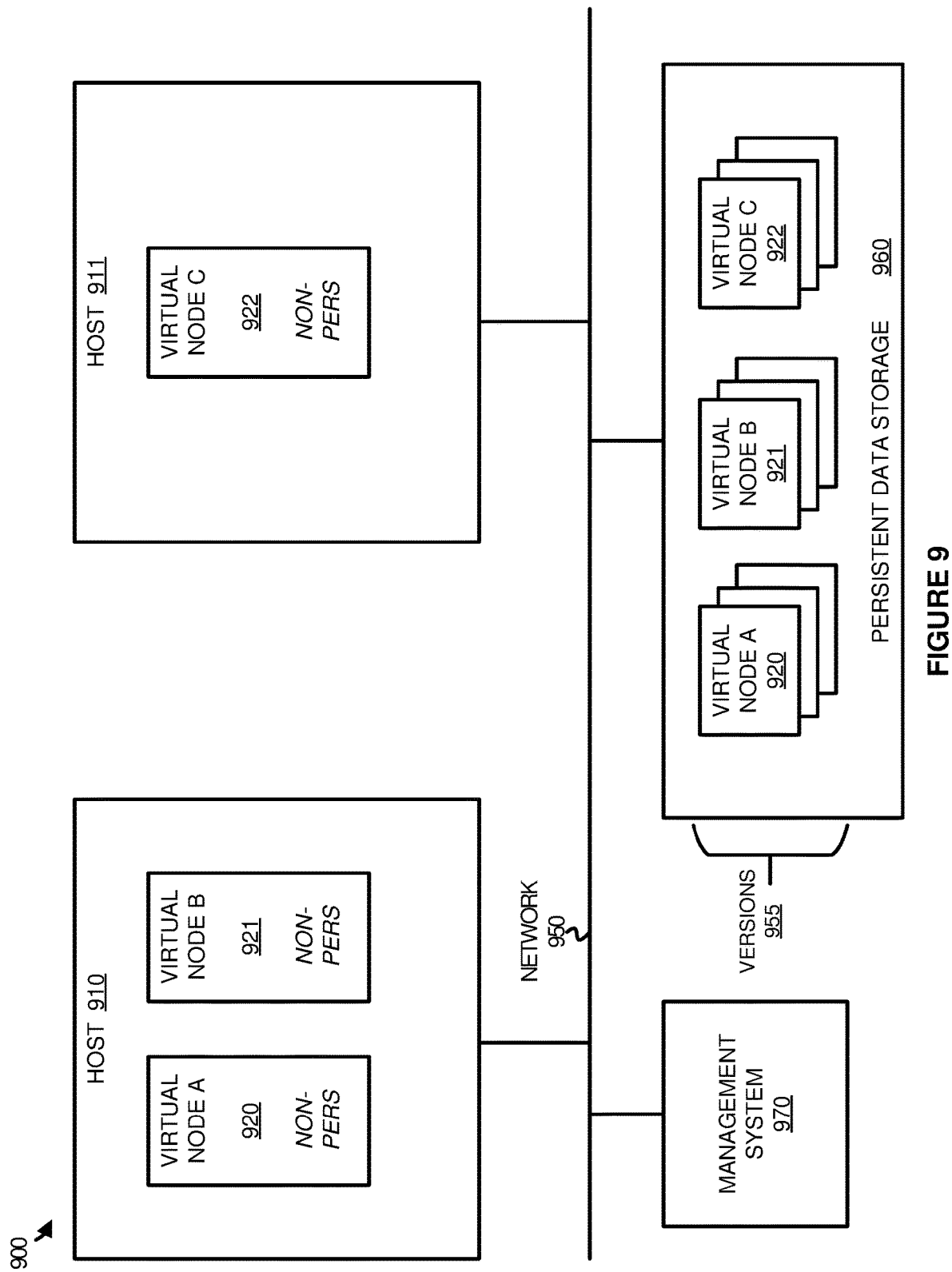
FIG. 9 illustrates computing environment to manage versions of virtual nodes according to an implementation.

FIG. 9 illustrates a computing environment 900 to manage versions of virtual nodes according to an implementation. Computing environment 900 includes hosts 910-911, management system 970, and persistent data storage 960. Hosts 910-911 further include virtual nodes 920-922. Persistent data storage 960 further includes persistent data for virtual nodes 920-922, wherein each node includes various node versions 955. Hosts 910-911, management system 970, and persistent data storage 960 are communicatively coupled via network 950.

As described herein, virtual nodes may be deployed in a computing environment to provide various data processing operations. In deploying the virtual nodes, each of the nodes may correspond to an image that defines data to be stored either locally in one of hosts 910 or 911 or in persistent data storage 960, wherein the portion that is local to the host may include non-persistent data, while the portion that is accessible from persistent data storage 960 may include data capable of being written to by the virtual node. In this manner, any data that is modified for the virtual node may be accessed by any of the hosts to provide efficient failover operations and preserve state information for the virtual node in the cluster during migrations.

In the present implementation, the persistent data portions for each virtual node of virtual nodes 920-922 may be maintained as versions 955 (or snapshots), wherein versions of the persistent portions may be taken at periodic intervals, after each modification to the persistent data, or some other similar interval. In some examples, the versions may be maintained as a cluster, wherein each node of a cluster may add a version at the same time. For example, virtual nodes 920-922 may correspond to data processing nodes that operate in a large-scale processing cluster, such as a Hadoop, Spark, or some other similar cluster. Once the cluster is deployed, an administrator may define that snapshots should be generated for the cluster every hour. As a result, because the data stored locally for virtual nodes 920-922 on hosts 910-911 is not modified, snapshots (represented as versions 955) may be generated every hour of the persistent data located in persistent data storage 960. These versions may comprise sparse files in some examples that indicate differences between the current version and a previous version of the persistent data.

As the new versions are generated, an administrator associated with computing environment 900 may request that the cluster be reverted to a previous version. This request may comprise user input indicating a time of interest for the cluster, may comprise a version of interest of the cluster, or may comprise any other information related to the cluster. In some implementations, when a rollback to a different version of the cluster is requested, management system 970 may stop execution of the current version of the virtual nodes and initiate execution of the virtual nodes on the same hosts using the requested version of the virtual nodes. In providing the requested version of the virtual nodes, management system 970 may use versions 955, or the sparse files associated with versions 955, to revert the persistent portions of the virtual nodes to the previous state. In other implementations, when a request is generated for a different version of the virtual nodes, management system 970 may identify one or more hosts in the computing environment to support the execution of the virtual nodes in the previous states and provide the hosts with the required non-persistent data to support the execution of the nodes on the newly identified hosts. Once provided with the non-persistent data, the new hosts may execute the required version of the virtual nodes using non-persistent data and the version data maintained in persistent data storage 960. In some examples, in providing the appropriate version management system 970 may comprise sparse files required to provide the required version of the data. For example, if a user requested a third version of a virtual node, then the sparse files may be used to provide the required version. In some implementations, versions 955 may include an original version of the persistent data when the virtual node (e.g. version when the node was initially deployed) and sparse files that may be applied to the original version to provide the required version.

Although demonstrated in the example, of computing environment as hosts 910-911 as communicating with persistent data storage 960 using network 950, it should be understood that hosts 910 may communicate with persistent data storage 960 using PCIe, fibre channel, or some other similar communication format that permits multiple hosts to communicate with persistent data storage 960.

Figure 10:
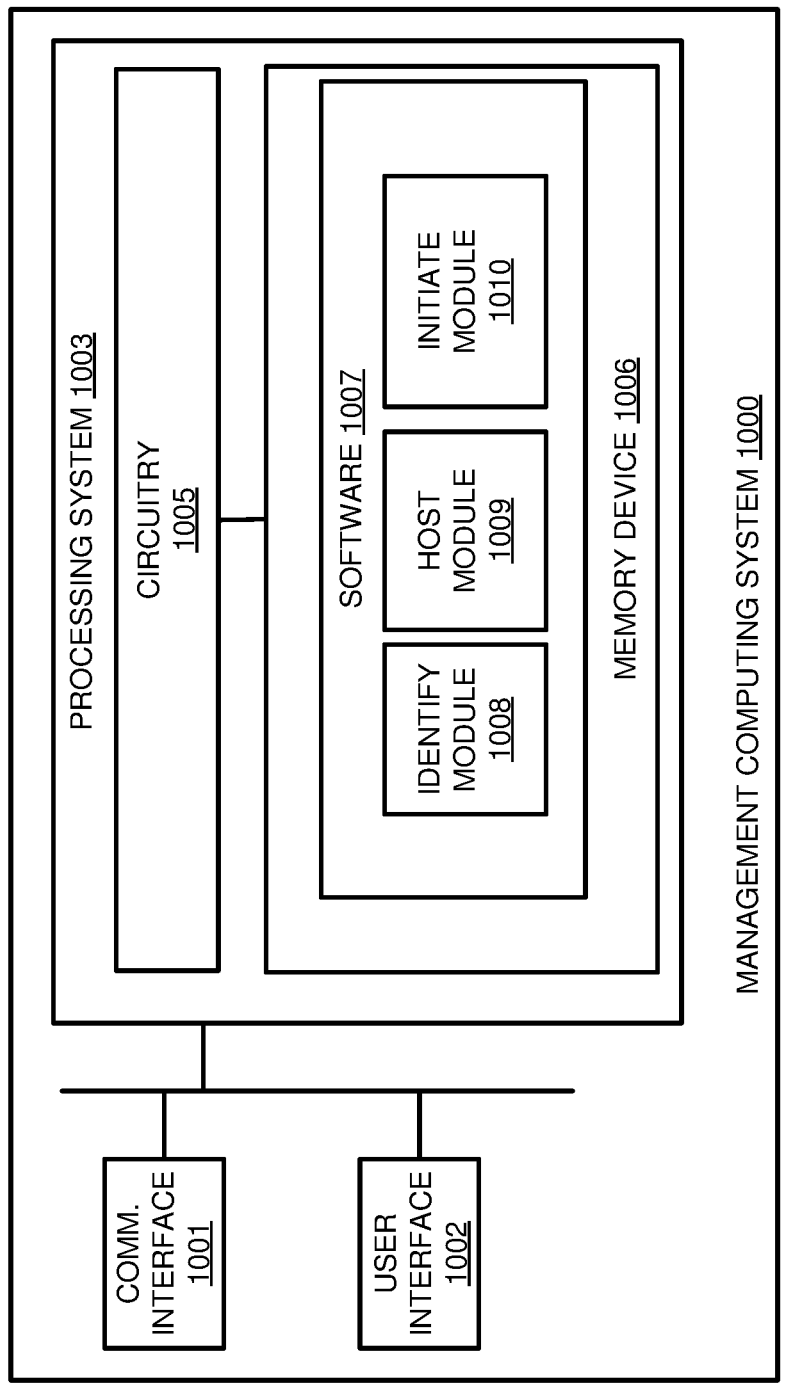
FIG. 10 illustrates a management computing system according to an implementation.

FIG. 10 illustrates a management computing system 1000 according to an implementation. Computing system 1000 is representative of any computing system or systems with which the various operational architectures, processes, scenarios, and sequences disclosed herein for a management system may be implemented. Computing system 1000 is an example of management systems 170, 670, and 970, although other examples may exist. Computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007. Computing system 1000 may include other well-known components such as a battery and enclosure that are not shown for clarity.

Communication interface 1001 comprises components that communicate over communication links, such as network cards, ports, radio frequency (RF), processing circuitry and software, or some other communication devices. Communication interface 1001 may be configured to communicate over metallic, wireless, or optical links. Communication interface 1001 may be configured to use Time Division Multiplex (TDM), Internet Protocol (IP), Ethernet, optical networking, wireless protocols, communication signaling, or some other communication format—including combinations thereof. In at least one implementation, communication interface 1001 may be used to communicate with one or more hosts of a computing environment, wherein the hosts execute virtual nodes to provide various processing operations. Communication interface 1001 may further communicate with persistent storage in some implementations capable of storing persistent portions of virtual nodes to be deployed in a computing environment.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some examples.

Processing circuitry 1005 comprises microprocessor and other circuitry that retrieves and executes operating software 1007 from memory device 1006. Memory device 1006 may include volatile and nonvolatile, removable and non-removable media implemented in any method or technology for storage of information, such as computer readable instructions, data structures, program modules, or other data. Memory device 1006 may be implemented as a single storage device, but may also be implemented across multiple storage devices or sub-systems. Memory device 1006 may comprise additional elements, such as a controller to read operating software 1007. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 1005 is typically mounted on a circuit board that may also hold memory device 1006 and portions of communication interface 1001 and user interface 1002. Operating software 1007 comprises computer programs, firmware, or some other form of machine-readable program instructions. Operating software 1007 includes identify module 1008, host module 1009, and initiate module 1010, although any number of software modules may provide a similar operation. Operating software 1007 may further include an operating system, utilities, drivers, network interfaces, applications, or some other type of software. When executed by processing circuitry 1005, operating software 1007 directs processing system 1003 to operate computing system 1000 as described herein.

In one implementation, identify module 1008 identifies a transition event for a virtual node executing in a computing environment to transition the virtual node from execution on a first host to execution on a second host. The transition event may be triggered by an administrator requesting the transition, may be triggered by a hardware or software failure, a software upgrade, or some other similar event. Once the event is identified, host module 1009 may identify a new host to support the transition event for the virtual node, and initiate module 1010 may initiate the execution of the virtual node on the new host. In some examples, in initiating the execution of the virtual node on the new host, initiate module 1010 may provide non-persistent data corresponding to the virtual node to the selected host for the virtual node. Once the required data is stored on the new host, and the virtual node on the original host stops execution, initiate module 1010 may initiate execution of the virtual node on the newly identified host. The execution of the new virtual node may use the locally stored non-persistent data for the virtual node and the persistent data accessible via the second storage element communicatively coupled to the host. The second storage element may be coupled via ethernet, PCIe, fibre channel, or some other similar communication platform.

In some implementations, in addition to migrating virtual nodes in a computing environment, computing system 1000 may also be responsible for maintaining images for the virtual nodes and deploying clusters of virtual nodes in the computing environment. For example, identify module 1008 may identify a request to modify a cluster in the computing environment, wherein the modification may comprise a request to add virtual nodes to an existing cluster. In response to the request, host module 1009 may determine one or more hosts to support the request and allocate the required virtual nodes to each of the hosts, wherein allocating the nodes includes storing the non-persistent data for each of the nodes on the corresponding host and configuring access to the persistent data storage system. Once stored in the appropriate locations, the virtual nodes may initiate execution on the corresponding hosts, wherein each of the hosts may identify data requests (both read and write requests) and direct the requests to either the local host storage or the remote persistent data storage system.

Figure 11:
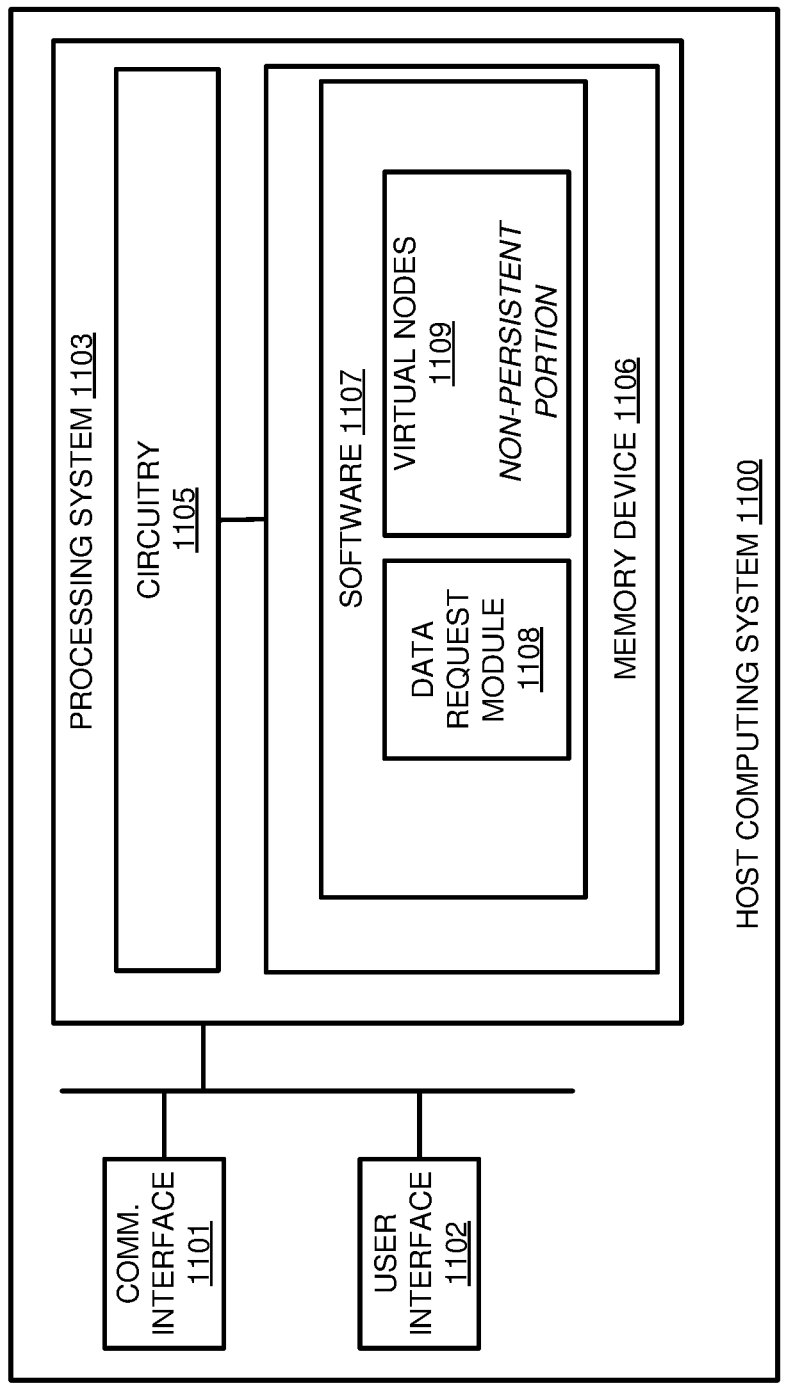
FIG. 11 illustrates a host computing system according to an implementation.

FIG. 11 illustrates a host computing system 1100 according to an implementation. Computing system 1100 is representative of any computing system or systems with which the various operational architectures, processes, scenarios, and sequences disclosed herein for a host may be implemented. Computing system 1100 is an example of hosts 111-112, 610-612, and 910-911, although other examples may exist. Computing system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. Computing system 1100 may include other well-known components such as a battery and enclosure that are not shown for clarity.

Communication interface 1101 comprises components that communicate over communication links, such as network cards, ports, radio frequency (RF), processing circuitry and software, or some other communication devices. Communication interface 1101 may be configured to communicate over metallic, wireless, or optical links. Communication interface 1101 may be configured to use Time Division Multiplex (TDM), Internet Protocol (IP), Ethernet, optical networking, wireless protocols, communication signaling, or some other communication format—including combinations thereof. In at least one implementation, communication interface 1101 may be used to communicate with one or more hosts of a computing environment and a management system, such as management computing system 1100, for configuration information related to executable virtual nodes. Communication interface 1101 may further communicate with secondary persistent storage in some implementations capable of storing persistent portions of virtual nodes deployed in a computing environment.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may be omitted in some examples.

Processing circuitry 1105 comprises microprocessor and other circuitry that retrieves and executes operating software 1107 from memory device 1106. Memory device 1106 may include volatile and nonvolatile, removable and non-removable media implemented in any method or technology for storage of information, such as computer readable instructions, data structures, program modules, or other data. Memory device 1106 may be implemented as a single storage device, but may also be implemented across multiple storage devices or sub-systems. Memory device 1106 may comprise additional elements, such as a controller to read operating software 1107. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 1105 is typically mounted on a circuit board that may also hold memory device 1106 and portions of communication interface 1101 and user interface 1102. Operating software 1107 comprises computer programs, firmware, or some other form of machine-readable program instructions. Operating software 1107 includes data request module 1108 and the non-persistent portions of virtual nodes 1109, although any number of software modules may provide a similar operation. Operating software 1107 may further include an operating system, utilities, drivers, network interfaces, applications, or some other type of software. When executed by processing circuitry 1105, operating software 1107 directs processing system 1103 to operate computing system 1100 as described herein.

In one implementation, virtual nodes 1109, which may comprise containers in some examples, are executed by processing system 1103 to provide various data processing operations. In some examples, virtual nodes 1109 may represent nodes that operate in one or more clusters that provide large-scale data processing operations on data sets, wherein the data sets may comprise distributed file systems, object storage systems, or some other storage systems that may be stored locally on host computing system 1100 or distributed across one or more other computing systems. To provide the operations for virtual nodes 1109, each virtual node may comprise a non-persistent portion that is stored locally on the host and may further include a persistent portion that is capable of read and write operations for the node. In some implementations, the administrator associated with the node may define what directories and files are located on the host and what data is located on the persistent data storage accessible by hosts of the computing environment. As a result, when an image of a virtual node is deployed, the data associated with the virtual node may be stored in a corresponding location of host computing system 1100 or the persistent data storage (not pictured.

Once the virtual nodes are executed, data request module 1108 identifies a data request related to a virtual node of virtual nodes 1109. In response to the request, data request module 1108 determines whether the request is related to a locally stored portion of the virtual node or a portion stored in the persistent portion for the virtual node based on addressing data associated with the request and the corresponding node. Once the location is identified, data request module 1108 may access the required data to satisfy a read request or may write the data to the persistent storage system if required.

Returning to the elements of FIG. 1, hosts 110-112 and management system 170 may each comprise communication interfaces, network interfaces, processing systems, computer systems, microprocessors, storage systems, storage media, or some other processing devices or software systems, and can be distributed among multiple devices. Examples of hosts 110-112 and management system 170 can include software such as an operating system, logs, databases, utilities, drivers, networking software, and other software stored on a computer-readable medium. Hosts 110-112 and management system 170 may comprise, in some examples, one or more server computing systems, desktop computing systems, laptop computing systems, or any other computing system, including combinations thereof. In some implementations hosts 110-112 may comprise virtual machines that comprise abstracted physical computing elements and an operating system capable of providing a platform for the virtual nodes. Hosts 110-112 may operate on the same physical computing system or may execute across multiple computing systems in these examples.

Persistent data storage 160 may reside on any computing system or systems that can include communication interfaces, network interfaces, processing systems, computer systems, microprocessors, storage systems, storage media, or some other processing devices or software systems, and can be distributed among multiple devices. Persistent data storage 160 may be located on one or more server computing systems, desktop computing systems, laptop computing systems, or any other computing system, including combinations thereof.

Communication between hosts 110-112, persistent data storage 160, and management system 170 may use metal, glass, optical, air, space, or some other material as the transport media. Communication between hosts 110-112, persistent data storage 160, and management system 170 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 110-112, persistent data storage 160, and management system 170 may be a direct link or can include intermediate networks, systems, or devices, and can include a logical network link transported over multiple physical links. In some implementations hosts 110-112 may communicate with persistent data storage 160 using ethernet, however, it should be understood that the communication may comprise PCIe, fibre channel, or some other similar communication protocol.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing virtual nodes in a computing environment comprising a plurality of hosts, the method comprising:
    identifying a transition event for a first version of a virtual node executing on a first host of the plurality of hosts, wherein the first version of the virtual node comprises non-persistent storage on the first host and persistent storage on a second storage element;
    in response to the transition event, identifying a second host in the plurality of hosts for a second version of the virtual node; and
    initiating execution of the second version of the virtual node on the second host, wherein the second version of the virtual node comprises non-persistent storage on the second host and the persistent storage on the second storage element wherein
        the non-persistent storage is stored locally on the executing host while the corresponding node executes on the host, and
        the persistent storage remains persistent while the node is moved between hosts.

2. The method of claim 1, wherein the virtual node comprises a container.

3. The method of claim 1, wherein the plurality of hosts comprises physical computing systems or virtual machines.

4. The method of claim 1, wherein the transition event comprises a hardware failure of the first host.

5. The method of claim 1, wherein the transition event comprises a software update or failure of the first host.

6. The method of claim 1, wherein the transition event comprises a user request to transition the virtual node from the first host to the second host.

7. The method of claim 1 further comprising stopping execution of the first version of the virtual node on the first host, and wherein initiating execution of the second version of the virtual node on the second host comprises initiating execution of the second version of the virtual node on the second host in response to stopping execution of the first version of the virtual node.

8. The method of claim 1, wherein identifying the second host for the second version of the virtual node comprises selecting the second host based on processing loads associated with the plurality of hosts.

9. The method of claim 1, wherein identifying the second host for the second version of the virtual node comprises selecting the second host based on processing requirements associated with the virtual node.

10. The method of claim 1, wherein the second storage element comprises a storage element communicatively coupled by Ethernet to at least the first host and the second host, a storage element communicatively coupled by fibre channel to at least the first host and the second host, or a storage element communicatively coupled by Peripheral Component Interconnect Express (PCIe) to at least the first host and the second host.

11. A system comprising:
    one or more non-transitory computer readable storage media;
    a processing system operatively coupled to the one or more non-transitory computer readable storage media; and
    program instructions stored on the one or more non-transitory computer readable storage media to manage virtual nodes in a computing environment comprising a plurality of hosts that, when executed by the processing system, direct the processing to at least:
        identify a transition event for a first version of a virtual node executing on a first host of the plurality of hosts, wherein the first version of the virtual node comprises non-persistent storage on the first host and persistent storage on a second storage element;
        in response to the transition event, identify a second host in the plurality of hosts for a second version of the virtual node; and
        initiate execution of the second version of the virtual node on the second host, wherein the second version of the virtual node comprises non-persistent storage on the second host and the persistent storage on the second storage element wherein
            the non-persistent storage is stored locally on the executing host while the corresponding node executes on the host, and
        the persistent storage remains persistent while the node is moved between hosts.

12. The system of claim 11, wherein the virtual node comprises a container.

13. The system of claim 11, wherein the transition event comprises a hardware failure of the first host.

14. The system of claim 11, wherein the transition event comprises a user request to transition the virtual node from the first host to the second host.

15. The system of claim 11, wherein the program instructions further direct the processing system to stop execution of the first version of the virtual node on the first host, and wherein initiating execution of the second version of the virtual node on the second host comprises initiating execution of the second version of the virtual node on the second host in response to stopping execution of the first version of the virtual node.

16. The system of claim 11, wherein identifying the second host for the second version of the virtual node comprises selecting the second host based on processing loads associated with the plurality of hosts.

17. The system of claim 11, wherein identifying the second host for the second version of the virtual node comprises selecting the second host based on processing requirements associated with the virtual node.

18. The system of claim 11, wherein the second storage element comprises a storage element communicatively coupled by Ethernet to at least the first host and the second host, a storage element communicatively coupled by fibre channel to at least the first host and the second host, or a storage element communicatively coupled by Peripheral Component Interconnect Express (PCIe) to at least the first host and the second host.

19. An apparatus comprising:
one or more non-transitory computer readable storage media;
program instructions stored on the one or more non-transitory computer readable storage media to manage virtual nodes in a computing environment comprising a plurality of hosts that, when executed by a processing system, direct the processing system to at least:
identify a transition event for a first version of a virtual node executing on a first host of the plurality of hosts, wherein the first version of the virtual node comprises non-persistent storage on the first host and persistent storage on a second storage element;
in response to the transition event, select a second host for a second version of the virtual node based on processing requirements associated with the virtual node; and
initiate execution of the second version of the virtual node on the second host, wherein the second version of the virtual node comprises non-persistent storage on the second host and the persistent storage on the second storage element wherein
the non-persistent storage is stored locally on the executing host while the corresponding node executes on the host, and
the persistent storage remains persistent while the node is moved between hosts.

20. The apparatus of claim 19, wherein the virtual node comprises a container.

* * * * *